UNITED STATES PATENT OFFICE.

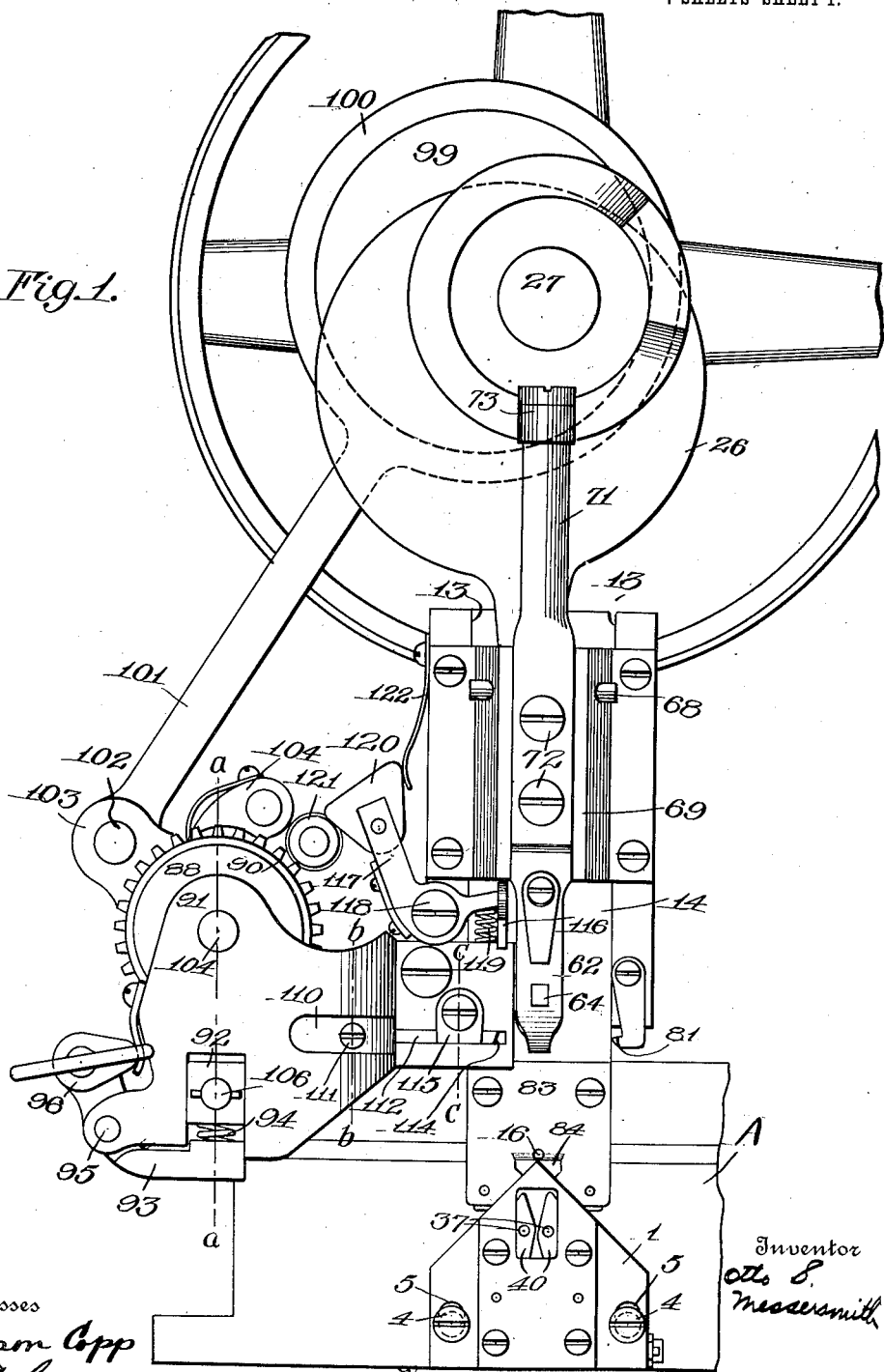

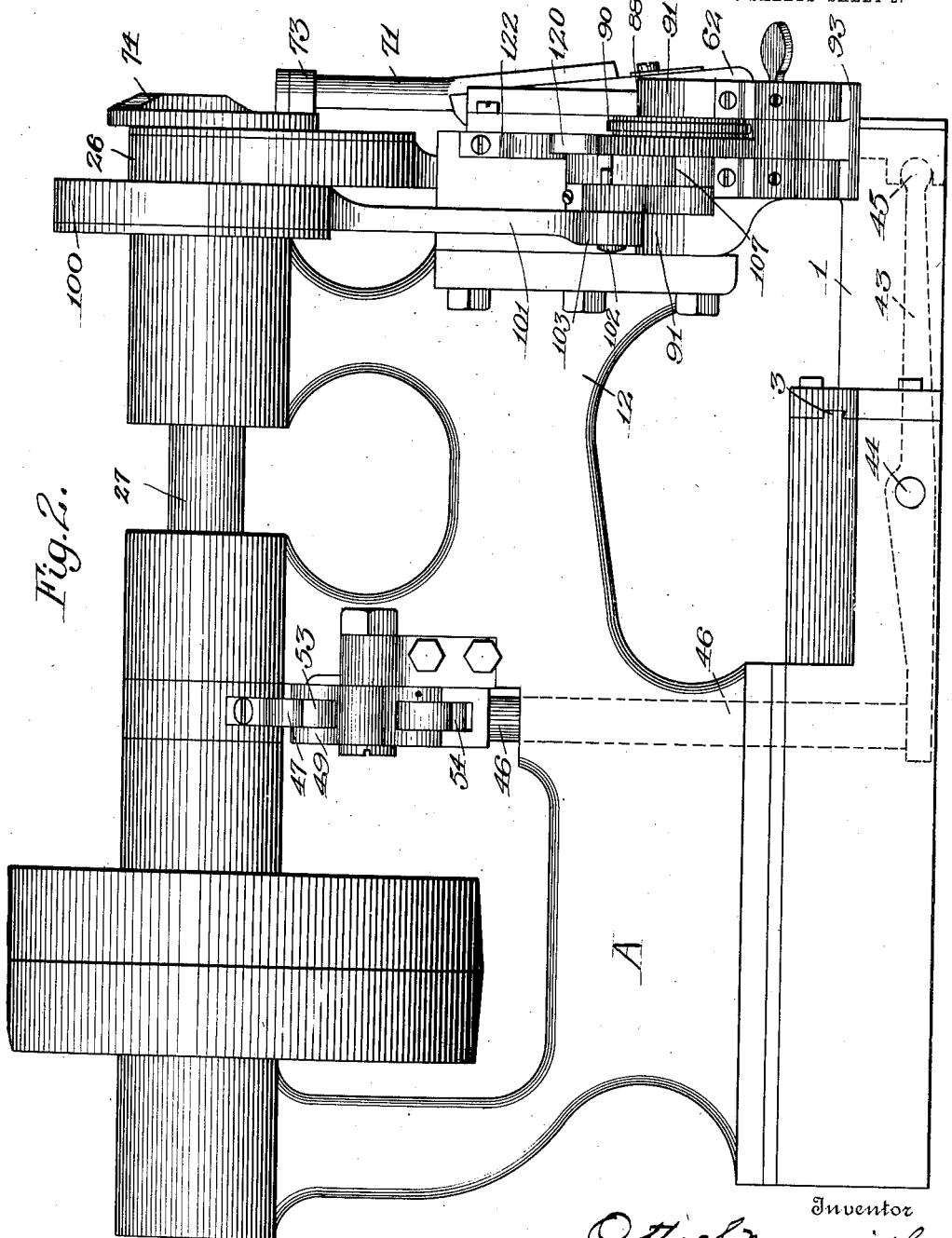

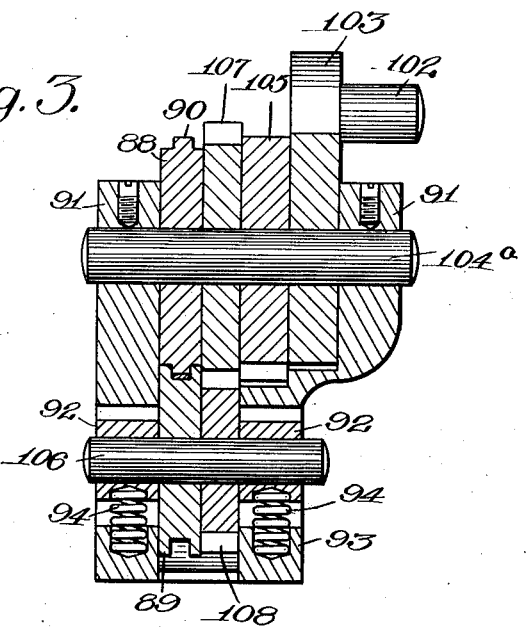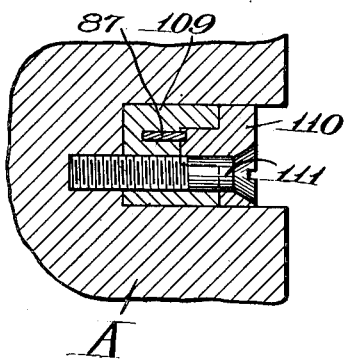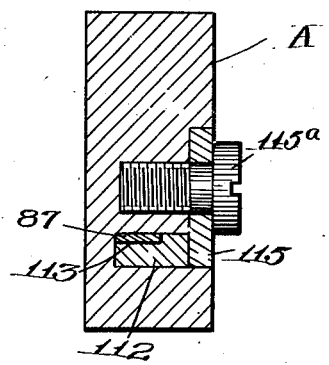

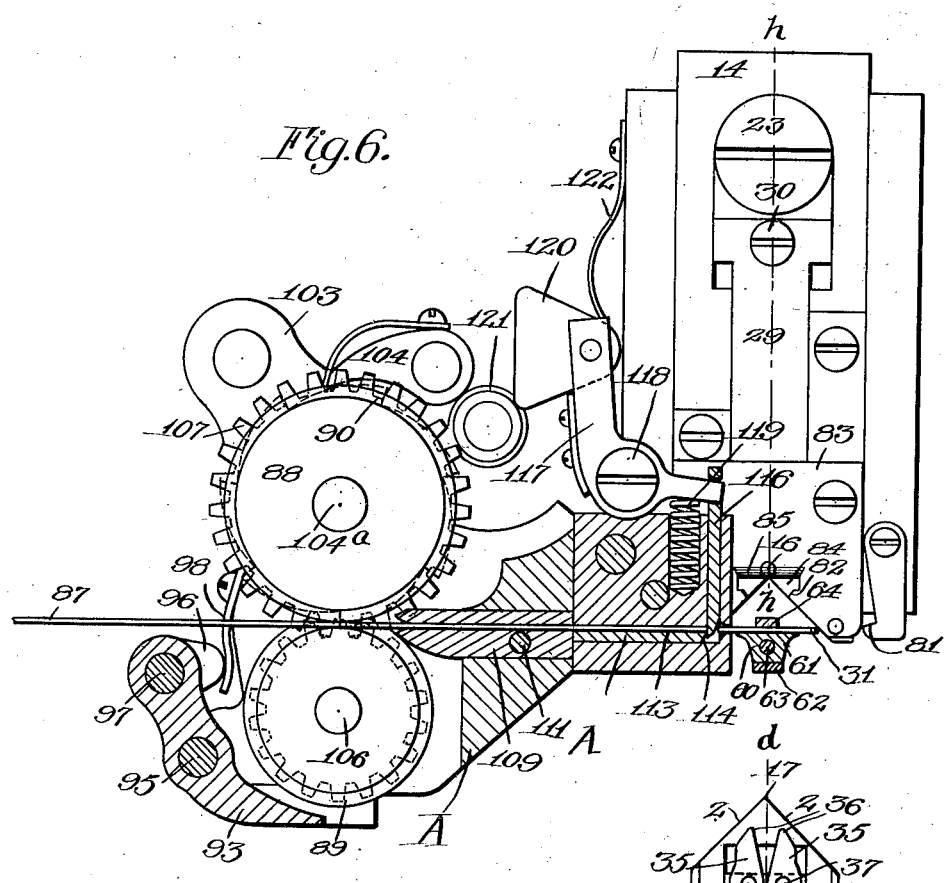

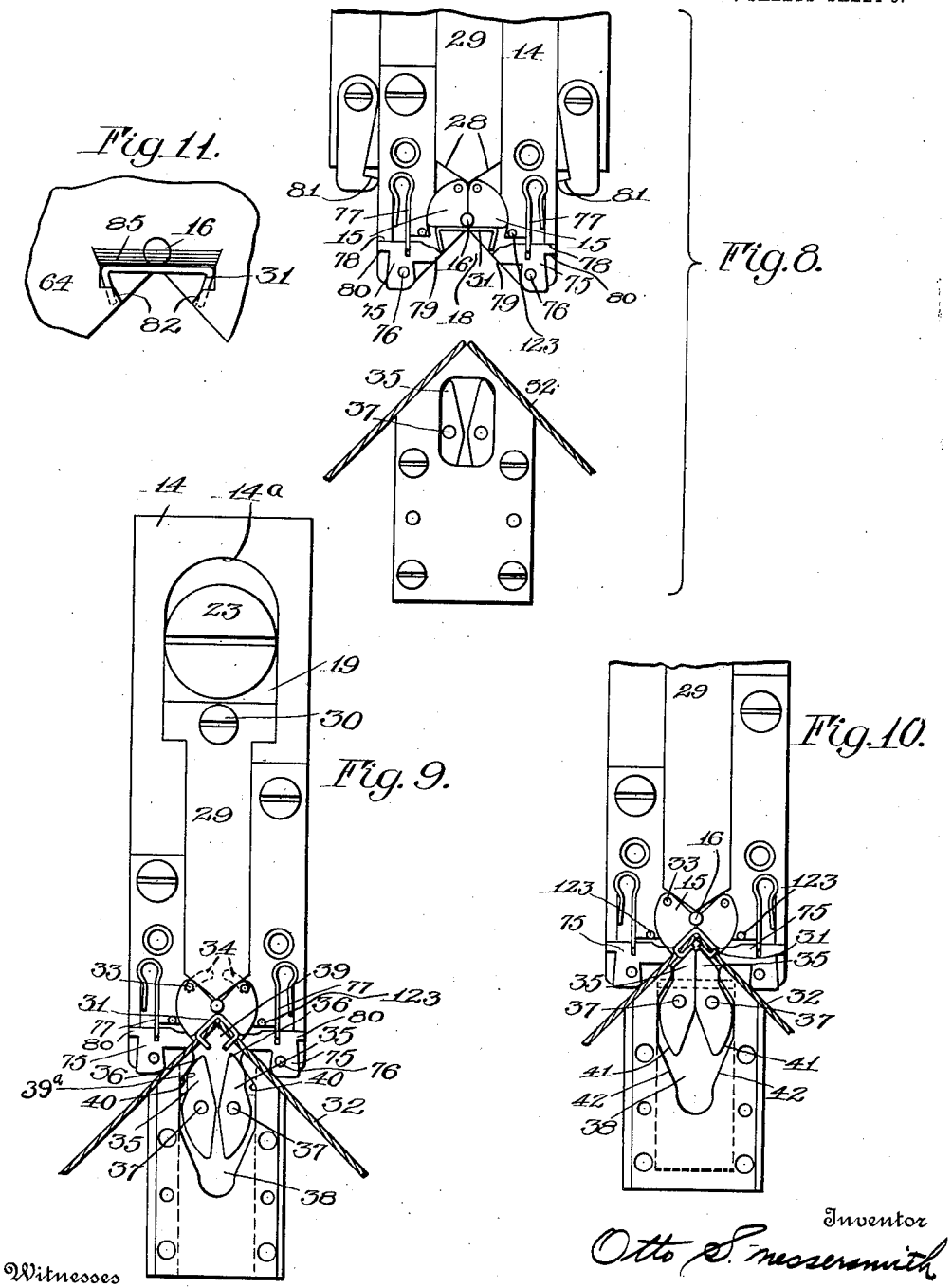

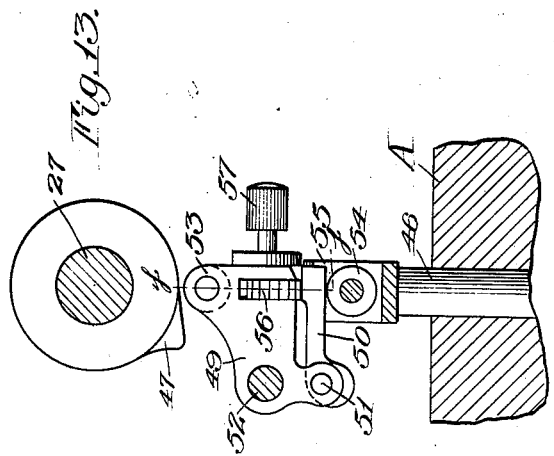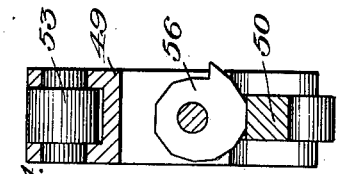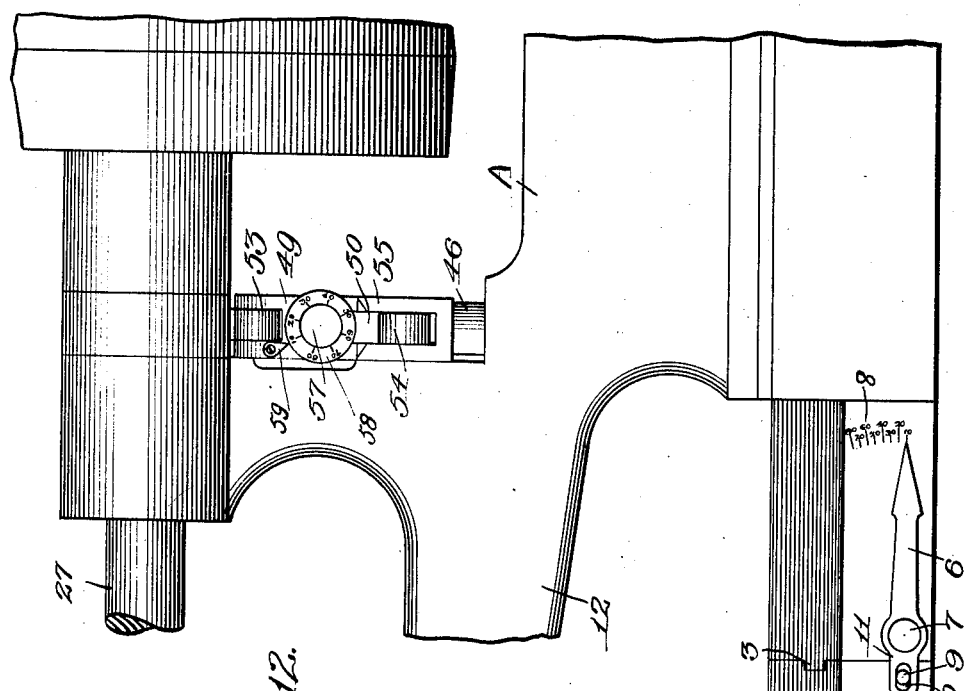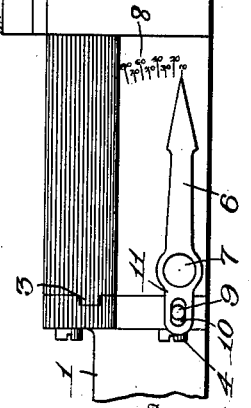

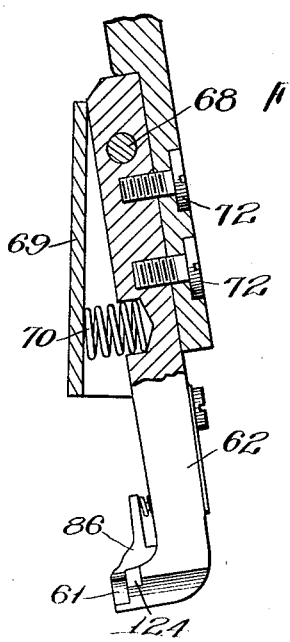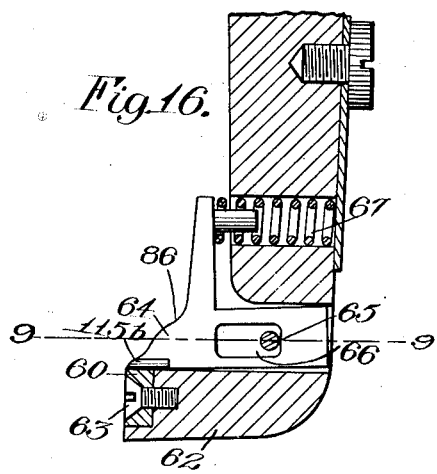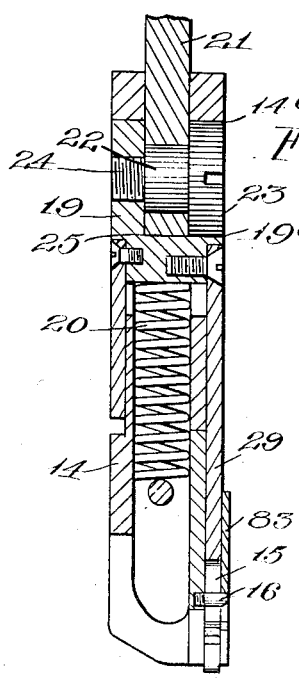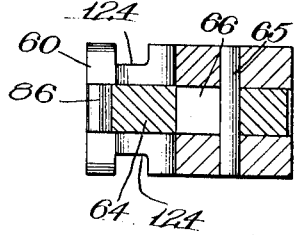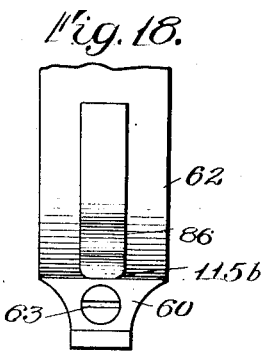

OTTO S. MESSERSMITH, OF ROCHESTER, NEW YORK.

STAPLING-MACHINE.

1,053,196.  Specification of Letters Patent.  Patented Feb. 18, 1913.

Application filed June 9, 1911. Serial No. 632,157.

*To all whom it may concern:*

Be it known that I, OTTO S. MESSERSMITH, of Rochester, in the county of Monroe and State of New York, have invented a new and useful Improvement in Stapling-Machines, which improvement is fully set forth in the following specification and shown in the accompanying drawings.

The present invention relates to stapling machines and an object of the same is to provide a construction which will effectively drive a staple to secure together the meeting edges of adjacent walls of trays, boxes, box covers and other similar articles in which two portions or pieces are arranged at angles to each other with the staple passing about the apex of the angle and having its ends driven into the two angularly arranged portions or pieces.
Another object of this invention is to provide for upsetting the ends of the staple in such a manner that the ends will lie flat against the inner faces of the work piece.

Still another object of the invention is to provide a simple staple forming mechanism which will present a properly formed staple in the path of the driving means in order that the latter may act properly upon the staple.
Another object is to make provision whereby the machine may be accommodated to materials of different thickness.

To these and other ends the invention consists in certain parts and combinations of parts all of which will be hereinafter described, the novel features being pointed out in the appended claims.

In the drawings: Figure 1 is a front view of a machine constructed in accordance with this invention; Fig. 2 is a side elevation; Fig. 3 is a section on a line *a—a* of Fig. 1; Fig. 4 is a section on a line *b—b* of Fig. 1; Fig. 5 is a section on a line *c—c* of Fig. 1; Fig. 6 is an enlarged detail view showing the feeding and cutting devices in section and the positions of the work support, driving means and staple forming means when the staple is being severed from the stock strip; Fig. 7 is a section on a line *d—d* of Fig. 6; Figs. 8, 9 and 10 show three different positions of the driving means and the upsetting means; Fig. 8 showing the formed staple about to be driven into the work piece, Fig. 9 showing the staple after it has been driven and prior to its ends being upset, and Fig. 10 showing the manner in which the staple is upset; Fig. 11 shows the manner in which the staple is stripped from the anvil; Fig. 12 is a detail view of that side of the machine opposite to the side shown in Fig. 2; Fig. 13 is a detail section of the frame of the machine in a plane transverse of the drive shaft and to one side of the adjusting devices for the work support; Fig. 14 is a section on the line *f—f* of Fig. 13; Fig. 15 is a detail view, partially in section, of the anvil which feeds the cut stock in the path of the driving devices and has the staple formed thereon; Fig. 16 is an enlarged detail sectional view of the anvil with some of its associated parts; Fig. 17 is a section on the line *g—g* Fig. 16; Fig. 18 is detail front view of the anvil; and Fig. 19 is a section on the line *h—h* of Fig. 6.

In carrying out the invention there may be employed a frame work of any suitable construction having a work support 1 preferably projecting forwardly therefrom, said work support, in this instance, having a pair of angularly arranged supporting faces 2 adapted to coöperate with the inner faces of the sides of a tray, a box, or a box cover or in fact with any two angularly arranged portions or pieces forming a corner between them. In this embodiment of the invention, the work support is arranged stationarily upon the frame A but, in order to accommodate the machine to materials of different thickness, the work support is vertically adjustable on the frame A, and, to this end, said frame may be provided with vertical guides 3, the work support 1 being held in its adjusted position on the guides by clamping bolts 4 engaging the frame A and working in slots 5 in the work support to permit the adjustment.

To determine the proper adjustment of the work support, an index or pointer 6 may be pivoted at 7 to the frame A and travel over a dial 8, the divisions of which may correspond to the measurement the article worked upon, as for instance, what is called, " points " in the paper trade. The connection between this index or pointer 6 and the work support 1 may be established by a pin 9 on the work support operating in a slot 10 formed in an arm 11 lying on that side of the pivot 7 of the pointer opposite the indicating end.

*Driving mechanism.*—The driving means, in this instance, is in the form of two copivoted drivers 15 having their common axis 16 arranged vertically above the apex of the work support. The drivers, in this instance, are mounted on a carrier 14 which preferably moves on vertical guide ways 13 formed at the forward end of a forwardly projecting frame arm. At its lower end, the carrier 14 is notched at 18 to conform with the angular portion of the work support so that the two may coöperate to clamp a work piece between them. The carrier is resiliently supported by a head 19, said parts having coöperating guides and housing between them a helical spring 20 which permits the yielding of the carrier on the head 19. To the drive head, a pitman 21 is pivoted, preferably on a pivot bolt 22 which has an enlarged head 23 with wide bearing on the drive head 19 at $19^a$ and on the carrier 14 at $14^a$ to remove strain from the bolt threads 24. Furthermore, the end of the pitman has rocking bearing at 25 on the head 19 to still further remove strain from the pivot 22. The pitman is operated in any suitable manner but, in this instance, it has an eccentric ring 26 secured thereto and coöperating with an eccentric $26^a$ on a main driving shaft 27 which is journaled on the frame A.
It is apparent that the pitman with the eccentric will effect the movement of the head, the carrier and the driving devices toward and from the work support. The parts are so arranged that, before the drive head reaches the end of its downward movement, the carrier 14 will engage the work support so that a farther downward movement of the drive head causes the carrier to compress the spring 20 and yield on the head.
Upon the commencement of the yielding action, abutments 28, formed by angularly arranged faces on a removable piece 29 that is secured to the head 19 by a screw 30, coöperate with the opposed faces of the pivoted drivers 15, as will be clearly seen in Fig. 9, and move them on their common pivot 16, thus bending the staple 31 about the corner of the work piece 32 and exerting pressure on said staple in line with the arms of the staple so that an effective driving action is secured. In order to limit the movement of the drivers 15 the latter may be provided with stops 33 which operate within arcuate slots 34 and coöperate with the end walls of said slots at the ends of their movements.

*Upsetting means.*—A feature of the present upsetting means is that it engages first those portions of the projecting ends of the driven staple that lie in immediate proximity to the inner or under faces of the work piece and then follows up the ends forcing them toward each other and into close engagement with the inner or under face of the work piece. This operation prevents the staple ends from being bent improperly, thus securing an effective anchoring of the staple.

In the present embodiment of the invention, the upsetting means comprises two members 35 having pointed staple engaging ends 36 and pivoted at 37 to a slide 38 which is guided vertically on the work support, said work support being cut away at 39 to receive the projecting ends of the staple 31 so that said ends may be engaged by the upsetting devices 35.

The operation of the upsetting devices may be effected by means of a suitable mechanism, to be described, which reciprocates vertically the slide 38. On the upward movement of the slide, the pointed ends 36 engage those portions of the staple in immediate proximity to the inner or under face of the box or work piece, this movement being preferably effected by cam faces $39^a$ on the upsetting dogs 35 engaging cam faces 40 on the work support 1, thus moving the upper ends of the dogs 35 together and causing them finally to reach the positions shown in Fig. 10. On the downward movement of the slide 38, cam faces 41 arranged on the dogs 35, on opposite sides of the pivots 37, coöperate with cam abutments 42, thereby moving together the lower ends of the dogs 35 and separating their upper ends for the next upsetting operation.

The mechanism for effecting in reciprocation of the slide 38 on the work support comprises, in this instance, a lever 43 pivoted at 44 and having one end 45 rockingly engaging the slide and its other end engaged by a plunger 46 that is guided vertically on the frame A and periodically depressed by a cam projection 47 on the shaft 27 which operates the driving devices, a spring 48 being arranged above the forward end of the lever 43 in order to depress the latter against the action of the plunger 46.

It is apparent that, when the work support 1 is adjusted vertically to accommodate the machine to work pieces of different thickness, adjustment should also be provided for the upsetting devices and, to this end, an adjusting device may be arranged in the mechanism for actuating the upsetting devices. This adjusting device, in this instance, comprises a pair of relatively movable members 49 and 50 preferably pivoted together at 51 and pivotally supported at 52 on the frame of the machine. One of said members carries a roller 53 adapted to be engaged by the cam projection 47, while the other of said members rests upon a roller 54 supported on the upper end of the plunger 46, said end being bifurcated and projecting above the roller 54 at 55 so as to guide the member 50 of the adjusting device. Interposed between the members 49 and 50 is an adjusting member preferably of the form of a rotary cam 56 having its periphery formed so as to gradually recede from the axis about which the cam turns, thus causing the members 49 and 50 to be moved toward or from each other on their pivot 51 when the cam is turned, a thumb piece 57 preferably being employed for effecting the turning. It will be seen that the relative adjustment of the members 49 and 50 varies or changes the distance between the roller 53 and the lever 43 so that, with the adjustment of the cam 56, the lever 43 turns to shift the position of the slide 38 with reference to the work support and changes the positions of the upsetting dogs. The adjustment devices may have a dial or indicator 58 for coöperation with the index 59, the divisions of the indicator 58 being the same as those of the indicator 8 in order that the adjustment of the work support and the upsetting devices may be made to agree.

*Staple forming mechanism.*—The staple is formed preferably on an anvil 60 which, in this instance, has a substantially flat top and downwardly converging sides 61, and is secured to a carrier 62 by a bolt or other means 63, the stock being fed to the anvil by means to be hereinafter described and held thereto by a retainer 64. The retainer is preferably mounted on the carrier 62 so that it has two movements, one a sliding movement in which it clears the upper face of the anvil 61 and the other a pivotal movement in which it rises above the anvil.
These two movements are preferably secured by loosely fulcruming the retainer on the carrier 62 by means of a pivot pin 65 on the carrier and a slot 66 in the retainer; a helical spring 67 being partially housed within the carrier and acting on the retainer 64 above the pivot 65, so that the spring has tendency to turn the retainer 64 on the pivot 65, thus giving to the spring the dual function of holding the retainer in firm engagement with the anvil and projecting said retainer over the anvil.

Normally the anvil lies out of the line of movement of the driving devices but it is adapted to be projected into vertical alinement with the pivoted hammers 15 during the downward movement of the carrier 14. To this end, the carrier 62 may be pivoted at 68 to a housing 69 which incloses the head 19 and carrier 14, a spring 70 being interposed between the housing 69 and the carrier arm 62, in order to hold the arm so that the anvil 60 lies out of vertical alinement with the pivoted hammers 15. The carrier arm 62 may have an extension 71 bolted or otherwise secured thereto at 72 and provided at its upper end with a roller 73 which travels on a cam face disk 74 secured to the end of the shaft 27. The greater portion of this cam is so formed that it permits the anvil to lie out of the path of driving device but when the high point of the cam is reached, this taking place during the commencement of the downward movement of the driving devices, the anvil is projected into the path of such driving devices.

From a feeding mechanism of any suitable type, the anvil receives a straight strip of stock of a length equal to the stock of the staple to be formed. When the anvil is in alinement with the driving device, formers or benders 75 lying on opposite sides of and below the hammers 15 engage those portions of the staple that project beyond the sides of the anvil and bend said projecting portions downwardly and inwardly into engagement with the converging sides 61 of the anvil. Preferably, the benders or formers 75 are pivoted at 76 to the carrier 14 below and on opposite sides of the pivot 16 of the hammers and are pressed against stops 78 and into the path of the staple by springs 77 also carried by the carrier 14.

When the carrier 14 lowers, after the staple stock has been projected into its path, the ends 79 of the bending dogs 76 engage the ends of the anvil and are thus swung on their pivots 76 so that the shoulders 80 are thrown outwardly and engage with fixed shoulders 81 arranged in their path on the frame of the machine, all of which will be clearly seen in Figs. 6 and 8. When the shoulders or abutments 81 engage the shoulders 80 on the benders, the latter are swung suddenly downwardly at their ends 79, causing the latter to wipe or press against the inclined sides 61 those ends of the staple stock projecting from the anvil, thus forming the staple 31. As the width of the staple is greater than the distance between the bender ends 79, the staple can not again pass the benders.

Immediately that the staple is formed, the anvil moves laterally from the path of the driving devices, and, to the end that the staple may be held within the carrier 14, the latter may be provided with a stripper preferably formed by a plate 83 having an opening 84 through which the anvil may be withdrawn, lugs 82 on the plate engaging with the depending ends of the staple and stripping the latter from the anvil. This action is facilitated by reason of the release of the staple by the retainer 64, such release being effected during the formation of the staple, owing to the engagement of the inclined face 85 on the plate with the inclined face 86 on the retainer, this coöperation causing the retainer to move laterally of the anvil 60 against the action of the spring 67. The continued downward movement of the carrier 14 causes the latter to engage the work piece of the work support and yield on the driving head 19 so that the abutments 28 on said head spread the hammers 15 which bend the staple 31 about the corner of the work piece and drive the ends of the staple into the work piece so that they may be engaged by the upsetting device as before set forth.

*Feeding mechanism.*—The stock is preferably in the form of a long strip of wire or tape 87 led from a suitable support to and between two feeding rollers 88 and 89, the latter of which is grooved to receive the tape which is pressed therein by a peripheral flange on the former. The roller 90 preferably has its shaft stationarily supported at 91 on the frame A while the roller 89 has its shaft supported in bearings 92 which are resiliently carried by a movable or pivoted frame 93, springs 94 being interposed between the bearings and the frame, and the latter being pivoted at 95 to the main frame A. The purpose of supporting the roller 89 on the movable frame 93 is to permit the roller 89 to be moved out of coöperation with the drive roller 88 so that the feeding of the machine may be stopped at any time. Preferably, the rollers 88 and 89 are held in coöperation by a rotary cam or manually operable eccentric 96 turning on the frame 93 at 97 and coöperating with a yielding or spring member 98 on the frame A in such a manner that when engaged with said spring member the cam is locked against movement.

The drive roller 88 may be operated from the drive shaft 27, the latter for this purpose having an eccentric 99 engaging an eccentric ring 100 which in turn rigidly supports a pitman 101 pivotally connected at 102 to a swinging member 103 that loosely turns on a shaft 104ᵃ to which the drive roller 88 is rigidly secured. Carried by the swinging member 103 is a spring pressed dog 104 which coöperates with a ratchet wheel 105 also rigidly secured to the shaft 104ᵃ. Driving connection between the shaft 104ᵃ and the shaft 106 to which the roller 89 is rigidly secured, may be established by intermeshing pinions 107 and 108 respectively arranged on the shafts 104ᵃ and 106.

From the feeding rollers, the tape 87 passes through a guide comprising, in this instance, (see Fig. 4) two interlocking blocks 109 and 110 held together and to the frame A by a single bolt 11, the frame being provided with a pocket in one side to receive the blocks and the blocks projecting partially between the rollers so as to receive the tape 87 immediately that said tape has been passed from the rollers. The purpose of making the guide in two blocks is to facilitate the manufacture and repair thereof and to obtain greater accuracy in the guide.

*Cutting or severing mechanism.*—The cutting mechanism may also be of any desirable form but, in this instance, the tape 87, after passing from the guide blocks 109 and 110, travels over a stationary knife 112 formed with a pocket 113 in its upper face to coöperate with the frame A in order to provide a guide for the tape before the latter reaches the cutting edge 114. The knife 112 lies within a pocket in the frame A and may be held therein by a plate 115 secured by a screw or bolt 115ᵃ. A definite amount of the tape is projected beyond the end 114 of the stationary knife onto the anvil 60 and is here clamped by the retainer 64 while the anvil is located out of the path of the driving devices, the retainer being beveled at 115ᵇ to permit the tape to be passed beneath the retainer, the latter, in this instance, yielding upwardly about the pivot 65.

That portion of the tape projecting beyond the cutting edge 114 may be severed by a movable knife 116 which preferably reciprocates within the frame A above the fixed knife 113 and may be operated by a bell crank lever 117 pivoted at 118 to the frame A and pressed in a direction to elevate the knife by a spring 119. The bell crank lever carries a pivoted dog 120 which lies in the path of a roller 121 that is journaled eccentrically upon the swinging member 103, a spring 122 being arranged on the frame A and tending to move the dog 120 in one direction. The roller 121 coöperates with the dog 120 in such a manner that the bell crank lever is shifted to depress the knife 116 and sever the projecting portion of the tape. On the reverse or feeding movement of the member 103, the roller 121 coöperates with the dog 120 in such a manner that the said dog swings on the arm 117 (as shown in Fig. 1) without affecting the movement of the cutter 116.

Detailed operation of the parts of the present embodiment has been set forth in the foregoing description and it will be necessary at this point to give only a general description of the operation of the machine: The tape 87 from a reel or other source of supply is introduced into the mouth of the guide 109 and 110 when the cam 96 is turned to lower the roller 89, after which the cam 96 is rotated to the position shown in Fig. 6 to clamp the tape between the rollers 88 and 89. With the starting of the machine, the rollers are operated to feed the tape until a portion thereof projects beyond the knife edge 14 and rests upon the anvil 60 as shown in Fig. 6. The knife 116 is now operated through the engagement of the roller 121 with the dog 120 severing from the main portion, that portion of the stock which is located upon the anvil. When the cutting action takes place, the carrier 14 is in a raised position and the anvil lies to one side of the line of travel of the carrier. The anvil and the cut stock are now shifted into the path of the carrier which descends, causing the beveled ends 79 of the formers 75 to engage the cut stock at opposite sides of the anvil, and, as the distance between the extreme ends of the formers is less than the length of the anvil, the formers move upwardly on the carrier 14 about their pivots 76 until the stops 123 are reached. About this time, the distance between the formers is slightly greater than the length of the anvil, and the shoulders 80 are engaged by the fixed abutments 81 on the frame A, thus causing the depression of the ends 79 and consequently bending the projecting portions of the stock downwardly on opposite sides of the anvil, thereby forming the staple.

During the downward movement of the carrier 14, the inclined surface 85 on the carrier coöperates with the inclined face 86 on the retainer 64 and shifts the latter out of engagement with the staple. The staple now being confined within a pocket in the carrier above the benders 75, the anvil moves laterally from the path of the driving devices causing the staple to be stripped from the anvil by the projections 82 on the carrier, these projections during the downward movement of the carrier passing through ways 124 formed in the carrier arm 62 as will be seen clearly in Figs. 15 and 17. The carrier now proceeds with the staple supported therein on the formers 79 until the work piece 32 is engaged, when the carrier moves on the head against the action of the spring 20, thus causing the abutments 28 to engage the pivoted hammers 15 and separate the latter to simultaneously bend the staple about the corner and drive its ends through the work piece.

About the time the staple is driven, the slide 38 carrying pivoted upsetters 35 moves upwardly, causing the beveled faces 39 of the upsetters to coöperate with the beveled faces 40 on the work support so that their ends 36 engage the staple ends in close proximity to the inner face of the work and then follow up said ends pressing them in close engagement with the inner faces of the work piece. When the slide 38 lowers, the cam faces 41 on the upsetters 35 engage the cam faces 42 on the work support and separate the upper ends of the upsetters.

When it is desired to adjust the machine for work pieces of different thickness, the work support 1 is adjusted on frame A, the adjustment being determined by the indicator 6, and the positions of the upsetting devices relatively to the work support are changed by turning the cam 56 which elevates or depresses the slide 38 carrying the upsetters, the position of the slide being determined by the index for the cam.

From the foregoing it will be seen that there has been provided a simple driving mechanism which acts to bend the staple about the corner of the work piece and drive the same by engagement therewith in line with its points or arms. The ends or points are upset on the under side of the work piece in such a manner that better results are obtained. The staple is formed in a chamber in which it is supported by the forming means until acted upon by the driving devices. The cutting mechanism for the stock is of simple construction and is actuated by the feeding mechanism when the latter is not feeding the stock.

What I claim as my invention and desire to secure by Letters Patent is:

1. In a stapling machine, a driving mechanism embodying a pair of drivers mounted to turn about a common axis, and means for operating said drivers including a member movable between said drivers to move them in opposite directions.

2. In a stapling machine, the combination with an angular work support and mechanism for forming a two-pronged staple, of a driver support movable toward and from the work support and having a notched portion coöperating with the support to clamp the work, and a pair of drivers movable simultaneously with the driver support toward the work support, and means for actuating the drivers after the coöperation of the driver support and the work support.

3. In a stapling machine, the combination with a work support and means for forming a two-pronged staple, of a driver support, means for effecting the movement of the driver support toward the work support to clamp the work, a pair of copivoted drivers movable with the driver support toward the work support, and means for actuating the drivers after the coöperation of the driver support with the work support.

4. In a stapling machine, the combination with a work support and a carrier movable toward and from the work support to clamp work thereon, of a pair of drivers movably mounted on the carrier, and a part movable relatively to the carrier and to the drivers for actuating the latter.

5. The combination with a work support, of a head movable toward and from the work support, mechanism for moving said head, a member resiliently supported upon the head and adapted to coöperate with the work support to clamp work thereon upon the movement of the head toward the work support, and a driver carried with the head toward the work support.

6. The combination with a work support, of a head movable toward and from the work support, a member carried by the head and movable relatively thereto, said member coöperating with the work support to clamp the work on the latter, a driver movably mounted on said member, and a device on the head coöperating with the driver to actuate the latter during the relative movement of the head and the member and after the member has coöperated with the work support.

7. In a stapling machine, the combination with a work support and a carrier, one of which is movable toward and from the other, f a resilient support for the carrier yielding when the latter and the work support coöperate, a movable driver on the carrier, and means coöperating with the driver when the carrier yields to move the driver on the carrier.

8. The combination with a work support, of a head movable toward and from the work support, a carrier on said head arranged to coöperate with the work support, a pair of copivoted drivers mounted on the carrier to operate upon a single staple, and means on the head actuating the drivers after the carrier is stopped by the work support.

9. The combination with a work support, of a slidably mounted carrier movable toward and from the work support to engage the work piece, a head by which the carrier is driven, resilient means between the carrier and the head, pivoted drivers on the carrier, abutments on the head engaging the carrier on the yielding of the latter, and means for reciprocating the head.

10. In a stapling machine, the combination with an adjustable work support, of a slide movable on the work support, clenchers carried by the slide, a lever having an end engaging the slide, a plunger engaging the other end of the lever, a cam, and an adjusting device between the cam and the plunger comprising two copivoted members, one of which is pivoted to a fixed part, and an adjusting cam between said copivoted members.

11. In a stapling machine, the combination with a work support and a carrier, one of which is movable toward and from the other, of a driver on the carrier, an anvil movable toward and from the path of the movable part, and a retainer for holding the staple on the anvil, said retainer being engaged by said movable part to release the staple.

12. In a stapling machine, the combination with a movable carrier and a driver thereon, of an anvil movable toward and from the path of the carrier, means for feeding a piece of stock to the anvil while the latter is out of the path of the carrier, a retainer for holding stock on the anvil, engaged by the carrier to release the staple, forming means on the carrier coöperating with the anvil to form the staple, and means for removing the staple from the anvil as the latter is moving from the path of the carrier.

13. In a stapling machine, the combination with a work support, of a head movable toward and from the work support, a carrier resiliently supported by the head, a driver movable on the carrier, an abutment on the head engaging the driver when the carrier yields on the head, an anvil movable toward and from the path of the carrier, means for feeding a piece of stock to the anvil while the latter is out of the path of the carrier, formers on the carrier engaging the stock on the anvil to form a staple, a retainer for the stock engaged by the carrier to release the stock, and means for removing the staple from the anvil as the latter moves away from the path of the carrier.

14. In a stapling machine, the combination with a movable carrier and a driver thereon, of an anvil movable toward and from the path of the carrier, and a staple retainer carried by the anvil and engaged by the carrier to release the staple.

15. In a stapling machine, the combinatoin with a movable carrier and a driver thereon, of an anvil movable toward and from the path of the carrier, a staple retainer carried by the anvil having a movement toward and from the anvil and also bodily across the same, said retainer being engaged by the carrier to shift it across the anvil.

16. In a stapling machine, the combination with a movable carrier and a driver thereon, of an anvil movable toward and from the path of the carrier, and a staple retainer loosely fulcrumed to coöperate with the anvil and engaged by the carrier to free the staple.

17. In a stapling machine, the combination with a movable carrier and a driver thereon, of an anvil movable toward and from the path of the carrier, a pivot, a staple retainer having a slot loosely receiving the pivot, a spring tending to hold the retainer in coöperation with the anvil, and a portion on the carrier arranged to engage the retainer to cause it to release the staple.

18. In a stapling machine, the combination with a driver and an anvil movable toward and from the path of the same, of a spring pressed retainer for a staple on the anvil, and means moving with the driver for moving the retainer to release the staple.

19. In a stapling machine, the combination with an angular work support, of a carrier movable toward and from the work support and notched to fit the latter in order to clamp work thereon, an anvil movable toward and from the path of the carrier, devices arranged on the carrier on opposite sides of the notched portion for coöperating with the anvil during the movement of the carrier relatively to the anvil for the purpose of bending the ends of the staple on opposite sides of the anvil, and driving means operating upon the staple thus formed after the anvil has moved out of the path of the carrier.

20. In a stapling machine, the combination with an angular work support, of a carrier movable relatively to the work support and notched to fit the latter in order to clamp work thereon, an anvil movable into and out of the path of the carrier, devices arranged on the carrier on opposite sides of a notched portion for coöperating with the anvil to form a staple on said anvil, driving means operating upon the staple thus formed, and means for moving the anvil out of the path of the carrier and the driving means after the staple is formed.

21. In a stapling machine, the combination with an angular work support, of a carrier movable relatively to the work support and notched to fit the latter in order to clamp work thereon, an anvil movable toward and from the path of the carrier, pivoted devices arranged on the carrier on opposite sides of the notched portion for coöperating with opposite sides of the anvil during the movement of the carrier to form a staple, means for moving the anvil out of the path of the carrier after the staple is formed, and driving means for a staple thus formed.

22. In a stapling machine, the combination with an angular work support, of a carrier movable relatively to the work support and notched to fit the latter to clamp the work thereon, an anvil having converging sides and movable transversely to the line of movement of the carrier, said anvil being supported independently of the carrier so as not to travel therewith, pivoted devices for bending a staple in engagement with the converging sides of the anvil, said devices being mounted on the carrier on opposite sides of the notched portion thereof, and driving means for the staple thus formed.

23. The combination with a work support, of a carrier movable relatively to the work support, an anvil supported independently of the carrier and movable transversely of the line of movement of said carrier, said anvil having converging sides, devices pivoted to the carrier and coöperating with converging sides of the anvil to bend the staple in engagement with said converging sides, means for shifting the anvil transversely of the carrier after the staple is formed, stripping means for removing the staple from the anvil to support the same upon the pivoted devices, and a pair of copivoted drivers coöperating with the staple thus supported to drive the same in the work piece.

24. In a stapling machine, the combination with a work support, of a carrier movable toward and from the work support to coöperate therewith to clamp the work, a pair of pivoted formers on the carrier, an anvil movable transversely of the line of movement of the carrier into and out of the path of the formers, and stationary abutments coöperating with the formers during the movement of the carrier to cause the formers to form a staple on the anvil.

25. In a stapling machine, the combination with a driver, of a pair of pivoted formers moving with the driver, an anvil movable toward and from the path of the driver and having the staple stock formed thereon by the pivoted formers, and abutments coöperating with the formers to cause them to bend the stock on opposite sides of the anvil.

26. In a stapling machine, the combination with a carrier, of a pair of pivoted formers also arranged on the carrier, an anvil movable toward and from the path of the carrier, and abutments coöperating with the formers to cause them to bend the staple stock on opposite sides of the anvil.

27. In a stapling machine, the combination with an angular work support, of a head movable toward and from the work support, a carrier resiliently carried by the head and adapted to coöperate with the work support, a pair of copivoted drivers on the carrier, an abutment on the head engaging the drivers when the carrier yields, a pair of pivoted formers on the carrier, an anvil movable toward and from the path of the carrier, and abutments engaging the formers to cause them to form the staple on the anvil.

28. In a stapling machine, the combination with driving means and a work support, of an anvil and devices coöperating with opposite sides of the anvil to form the staple, the distance between said devices being less than the width of the staple before the latter is engaged by the driving means in order to support said staple in the path of the driving means.

29. In a stapling machine, the combination with the driving means and a work support, of an anvil movable toward and from the path of the driving means, and devices coöperating with opposite sides of the anvil to form the staple, the distance between said devices being less than the width of the staple before the latter is engaged by the driving means in order to support the latter in the path of the driving means.

30. In a stapling machine, the combination with a driving means, of an anvil having inclined sides and movable transversely of the path of the driving means, and pivoted dogs coöperating with the anvil to form the staple and then to support the same in the path of the driving means after the anvil has passed out of said path.

31. In a stapling machine, the combination with a driving means, of an anvil having inclined sides and movable transversely of the path of the driving means during the movement of the latter, pivoted dogs cooperating with the anvil to form the staple and support the latter in the path of the driving means, and a stripper for removing the staple from the anvil.

32. In a stapling machine the combination with a feeding mechanism embodying a ratchet wheel, a swinging member and a pawl carried by the swinging member, of a cutting mechanism embodying a reciprocating knife, a bell crank lever having one end connected to the knife, and a pivoted pawl connected to the other end of the lever and arranged to be engaged by the swinging member when the latter moves in one direction and to yield when the swinging member is moving in the other direction.

OTTO S. MESSERSMITH.

Witnesses:
H. H. SIMMS,
A. M. WHITMORE.